(12) United States Patent
Bagwell et al.

(10) Patent No.: US 9,618,228 B2
(45) Date of Patent: Apr. 11, 2017

(54) AIRFLOW DISTRIBUTION SYSTEM

(75) Inventors: Renee M. Bagwell, Niagara Falls, NY (US); William J. Stry, Orchard Park, NY (US)

(73) Assignee: Harper International Corporation, Buffalo, NY (US)

( * ) Notice: Subject to any disclaimer, the term of this patent is extended or adjusted under 35 U.S.C. 154(b) by 1576 days.

(21) Appl. No.: 13/180,215

(22) Filed: Jul. 11, 2011

(65) Prior Publication Data

US 2012/0015598 A1    Jan. 19, 2012

Related U.S. Application Data

(60) Provisional application No. 61/364,071, filed on Jul. 14, 2010.

(51) Int. Cl.
| | | |
|---|---|---|
| *F24F 7/06* | (2006.01) | |
| *F24F 13/072* | (2006.01) | |
| *F24F 13/08* | (2006.01) | |

(52) U.S. Cl.
CPC .......... *F24F 13/072* (2013.01); *F24F 13/081* (2013.01); *F24F 13/082* (2013.01)

(58) Field of Classification Search
CPC ........ F24F 13/072; F24F 13/082; F24F 13/06; F24F 13/081
(Continued)

(56) References Cited

U.S. PATENT DOCUMENTS

| | | | | |
|---|---|---|---|---|
| 3,821,463 A | * | 6/1974 | Bakker | .......................... 174/392 |
| 3,964,519 A | * | 6/1976 | De Baun | .......................... 138/37 |

(Continued)

FOREIGN PATENT DOCUMENTS

| | | |
|---|---|---|
| JP | H04-26425 | 3/1992 |
| JP | H0450749 | 8/1992 |

(Continued)

OTHER PUBLICATIONS

The International Search Report (ISR) and Written Opinion of the searching authority for PCT Application Serial No. PCT/US2011/043533; Publication No. WO/2012/009265 A3; dated Feb. 28, 2012.

(Continued)

*Primary Examiner* — Helena Kosanovic
(74) *Attorney, Agent, or Firm* — Phillips Lytle LLP; David L. Principe

(57) ABSTRACT

An improved airflow delivery system (1) comprising an air moving element (3) configured to move air in a flow path, a chamber (19) in the flow path configured to receive product (9), an air transfer chamber (11) comprising an inlet (10) of a selected area for receiving air in the flow path in a first direction (x-x) and an outlet (14) of a selected area greater than the area of the inlet for discharging air in the flow path in a second direction (y-y) different from the first direction, an airflow divider (33) extending across the air transfer outlet and configured to divide airflow in the flow path, an airflow directional (15) extending across the flow path downstream of the airflow divider and upstream of the chamber, the airflow directional having an upstream inlet face (28*a*) and a downstream outlet face (29*c*) and configured to receive airflow at the inlet face and split the airflow into multiple separated sub-paths (27) within the flow path and to discharge the airflow from the downstream outlet face substantially parallel to the flow path and without substantial reduction in static pressure.

41 Claims, 12 Drawing Sheets

(58) Field of Classification Search
USPC .................. 454/173, 305, 306, 309
See application file for complete search history.

(56) References Cited

U.S. PATENT DOCUMENTS

| | | |
|---|---|---|
| 4,515,561 A | 5/1985 | Melgaard |
| 6,539,934 B2 | 4/2003 | Moshonas et al. |
| 6,684,875 B1 | 2/2004 | Schjerven, Sr. et al. |
| 6,712,064 B2 | 3/2004 | Stacy et al. |

FOREIGN PATENT DOCUMENTS

| | | | |
|---|---|---|---|
| JP | 10-290752 A | | 11/1998 |
| JP | 2001289500 A | * | 10/2001 |
| JP | 200289849 | | 3/2002 |
| JP | 2002-243156 A | | 8/2002 |
| JP | 2002349944 A | * | 12/2002 |
| JP | 2004141759 A | * | 5/2004 |
| JP | 2004278865 | | 10/2004 |
| JP | 2006023003 | | 1/2006 |
| JP | 2009-100774 A | | 5/2009 |
| JP | 2009100774 | | 5/2009 |
| KR | 10-0479251 B1 | | 3/2005 |
| WO | WO 2010/040434 | | 4/2010 |

OTHER PUBLICATIONS

The (IB/373) International Preliminary Report on Patentability Chapter I for PCT Application Serial No. PCT/US2011/043533; Publication No. WO/2012/009265 A1; dated Jan. 15, 2013.

The International Search Report (ISR) and Written Opinion of the searching authority for PCT Application Serial No. PCT/EP2009/006509; Publication No. WO 2010/040434 A1; dated Mar. 10, 2010 (English translation published Apr. 6, 2011).

The (IB/373) English Translation of International Preliminary Report on Patentability Chapter I for PCT Application Serial No. PCT/EP2009/006509; Publication No. WO 2010/040434 A1; dated Apr. 12, 2011 (English translation published Apr. 12, 2011).

* cited by examiner

DETAIL B

AIRFLOW DISTRIBUTION SYSTEM

CROSS-REFERENCE TO RELATED APPLICATIONS

This application claims the benefit of U.S. Provisional Patent Application No. 61/364,071, filed Jul. 14, 2010.

TECHNICAL FIELD

The present invention relates generally to the field of ovens and dryers and, more particularly, to an improved oven or dryer airflow distribution system.

BACKGROUND ART

Convection ovens and dryers that process continuous streams of product are in wide use in both industrial and baking applications. In many ovens the product moves horizontally on one or more levels, either carried on parallel moving conveyors or, in the case of textiles or webs, suspended under tension between external drives. A circulating hot air flow is brought in contact with the product for heating or drying.

Certain means of providing airflow are known in the industry. U.S. Pat. No. 6,712,064 discloses an oven with multiple nozzles arranged both above and below the product conveyor, with the vertically directed airflow impinging the product at nearly a right angle. U.S. Pat. No. 6,539,934 and U.S. Pat. No. 6,684,875 describe impingement flow ovens with multiple parallel conveyors. These patents disclose that pressurized air from a fan discharge is distributed uniformly over the product by means of nozzles containing one or two perforated plates. Since the air flow contacts the product a very small distance from the nozzle discharge, it is not necessary that the nozzle provide airflow in a straight direction from the nozzle face.

For delicate products that can be damaged by perpendicular impingement flow, there is an advantage to having the air flow parallel to the product. U.S. Pat. No. 4,515,561 discloses an oven with airflow parallel to and in the same direction as product travel, with sets of nozzles arranged above and below the product and connected to the fan discharge header at the side of the oven. In this oven configuration the air contacts the product for a large distance, essentially the length of the oven, after leaving the nozzle.

BRIEF SUMMARY OF THE INVENTION

With parenthetical reference to corresponding parts, portions or surfaces of the disclosed embodiment, merely for the purposes of illustration and not by way of limitation, the present invention provides an improved airflow delivery system (1) comprising an air moving element (3) configured to move air in a flow path, a chamber (19) in the flow path configured to receive product (9), an air transfer chamber (11) comprising an inlet (10) of a selected area for receiving air in the flow path in a first direction (x-x) and an outlet (14) of a selected area greater than the area of the inlet for discharging air in the flow path in a second direction (y-y) different from the first direction, an airflow divider (33) extending across the air transfer outlet and configured to divide airflow in the flow path, an airflow directional (15) extending across the flow path downstream of the airflow divider and upstream of the chamber, the airflow directional having an upstream inlet face (28a) and a downstream outlet face (29c) and configured to receive airflow at the inlet face and split the airflow into multiple separated sub-paths (27) within the flow path and to discharge the airflow from the downstream outlet face substantially parallel to the flow path and without substantial reduction in static pressure.

The air moving element may comprise an eductor, a blower or a fan. The chamber may be a heating, cooling, curing or drying chamber. The air transfer chamber may comprise multiple turning vanes (13) in the flow path and the second flow path direction may be perpendicular to the first flow path direction. The airflow divider may comprise a perforated plate, wire mesh or a wire screen.

The airflow directional may comprise a first layer (21) having an upstream inlet face (28a) and a downstream outlet face (29a) and multiple separated sub-paths (27a) within the flow path between the inlet face and the outlet face, the first layer configured to receive airflow at the inlet face and split the airflow into the multiple separated sub-paths within the flow path and to discharge the airflow from the downstream outlet face, a second layer (22) downstream from the first layer and having an upstream inlet face (28b), a downstream outlet face (29b) and multiple separated sub-paths (27b) within the flow path between the inlet face and the outlet face, the second layer configured to receive airflow at the inlet face of the second layer from the outlet face of the first layer and to discharge the airflow from the downstream outlet face of the second layer. The multiple separated sub-paths (27b) of the second layer may be configured relative to the multiple separated sub-paths (27a) of the first layer to split the airflow discharged from the multiple separated sub-paths of the first layer into the multiple separated sub-paths of the second layer and to discharge the airflow from the downstream outlet face of the second layer. At least a portion of the airflow discharged from at least two separated sub-paths of the first layer may be mixed together in at least one of the separated sub-paths of the second layer.

The airflow delivery system may further comprise a second airflow divider (34) extending across the flow path downstream of the airflow directional and upstream of the chamber and configured to divide airflow in the flow path. The second airflow divider may comprise a perforated plate, wire mesh or a wire screen.

The area of the outlet (36x35) of the air transfer chamber may be at least about four times greater than the area of the inlet (36x37) of the air transfer chamber. The airflow divider may comprise multiple airflow openings having an aggregate area between about 5% and about 35% of the area of the outlet of the air transfer chamber. The airflow divider may comprise multiple airflow openings each having a longest dimension perpendicular to the flow path of between about 0.1 and about 0.75 inches.

The sub-paths may have an average depth (37) and may be defined at the inlet face by a pattern of repeated airflow openings (27), each of the openings having an area perpendicular to the flow path and characterized by a longest dimension (39) perpendicular to the flow path of between about 0.15 and 0.75 inches. The sub-paths may be defined at the inlet face by a pattern of repeated airflow openings, each of the openings having an area perpendicular to the flow path, and the pattern of repeated sub-paths may be a polygonal cellular pattern. The sub-paths may be formed from a thin-walled hexagonal honeycomb layer (21), or formed from multiple thin-walled hexagonal honeycomb layers (21-23), or formed from multiple off-set (40, 41) thin-walled hexagonal honeycomb layers. The sub-paths may have an average depth and may be defined at the inlet face by a pattern of repeated airflow openings, each of the openings having an area perpendicular to the flow path, and the sub-paths may have an average depth of between about 0.25 and about 3 inches, and the sub-path openings may have an area of between about 0.06 and about 1.5 square inches.

In another aspect, the invention provides an airflow delivery system comprising an air moving element configured to move air in a flow path, a chamber in the flow path configured to receive product, an air transfer chamber comprising an inlet of a selected area for receiving air in the flow path in a first direction and an outlet of a selected area greater than the area of the inlet for discharging air in the flow path in a second direction different from the first direction, an airflow divider extending across the air transfer outlet and having multiple airflow openings, the airflow openings of the airflow divider having an average depth and an aggregate area perpendicular to the flow path, an airflow directional extending across the flow path downstream of the airflow divider and upstream of the chamber, the airflow directional having an upstream inlet face, a downstream outlet face, and multiple different sub-paths between the inlet face and the outlet face, the sub-paths having an average depth and defined at the inlet face by a pattern of repeated airflow openings, each of the openings having an area perpendicular to the flow path and characterized by a longest dimension perpendicular to the flow path, the average depth of the sub-paths being greater than the average depth of the openings in the air flow divider, the aggregate area of the airflow openings in the inlet face of the airflow directional being substantially greater than the aggregate area of the airflow openings in the airflow divider, and the average depth of the sub-paths being greater than the longest dimension of the openings perpendicular to the flow path of the sub-paths.

The air moving element may comprise an eductor, a blower or a fan. The chamber may be a heating, cooling, curing, or drying chamber. The air transfer chamber may comprise multiple turning vanes in the flow path and the second flow path direction may be perpendicular to the first flow path direction. The air divider may comprise a perforated plate, wire mesh or a wire screen.

The airflow directional may comprise a first layer having an upstream inlet face and a downstream outlet face and multiple separated sub-paths within the flow path between the inlet face and the outlet face, the first layer configured to receive airflow at the inlet face and split the airflow into the multiple separated sub-paths within the flow path and to discharge the airflow from the downstream outlet face, a second layer downstream from the first layer and having an upstream inlet face, a downstream outlet face and multiple separated sub-paths within the flow path between the inlet face and the outlet face, the second layer configured to receive airflow at the inlet face of the second layer from the outlet face of the first layer and to discharge the airflow from the downstream outlet face of the second layer. The multiple separated sub-paths of the second layer may be configured relative to the multiple separated sub-paths of the first layer to split the airflow discharged from the multiple separated sub-paths of the first layer into the multiple separated sub-paths of the second layer and to discharge the airflow from the downstream outlet face of the second layer. At least a portion of the airflow discharged from at least two separated sub-paths of the first layer may be mixed together in at least one of the separated sub-paths of the second layer.

The sub-paths of the first layer may have an average depth and may be defined at the inlet face by a pattern of repeated airflow openings, the openings having an aggregate area perpendicular to the flow path and characterized by a longest dimension perpendicular to the flow path, the average depth of the sub-paths of the first layer being greater than the average depth of the openings in the air flow divider, the aggregate area of the airflow openings in the inlet face of the first layer being substantially greater than the aggregate area of the airflow openings in the airflow divider, and the average depth of the sub-paths of the first layer being greater than the longest dimension of the openings perpendicular to the flow path of the sub-paths. The sub-paths of the second layer may have an average depth and may be defined at the inlet face by a pattern of repeated airflow openings, the openings having an aggregate area perpendicular to the flow path and characterized by a longest dimension perpendicular to the flow path, the average depth of the sub-paths of the second layer being greater than the average depth of the openings in the air flow divider, the aggregate area of the airflow openings in the inlet face of the second layer being substantially greater than the aggregate area of the airflow openings in the airflow divider, and the average depth of the sub-paths of the second layer being greater than the longest dimension of the openings perpendicular to the flow path of the sub-paths.

The pattern of repeated airflow openings of the sub-paths of the first layer may be substantially different from the pattern of repeated airflow openings of the sub-paths of the second layer. The average depth of the sub-paths of the first layer may be substantially different than the average depth of the sub-paths of the second layer. The aggregate area of the airflow openings in the inlet face of the first layer may be substantially different than the aggregate area of the airflow openings in the inlet face of the second layer. The longest dimension of the openings of the sub-paths of the first layer may be substantially different than the longest dimension of the openings of the sub-paths of the second layer.

The area of the outlet of the air transfer chamber may be at least about four times greater than the area of the inlet of the air transfer chamber. The airflow openings of the airflow divider may have an aggregate area between about 5% and about 35% of the area of the outlet of the air transfer chamber. The airflow openings of the airflow divider may each have a diameter and the diameter may be between about 0.1 and about 0.75 inches. The longest dimension of each of the sub-paths may be between about 0.15 and 0.75 inches.

The pattern of repeated sub-paths may be a hexagonal cellular pattern. The pattern of repeated sub-paths may be a polygonal cellular pattern. The sub-paths may be formed from a thin-walled hexagonal honeycomb layer. The sub-paths may be formed from multiple thin-walled hexagonal honeycomb layers, or formed from multiple off-set thin-walled hexagonal honeycomb layers. The sub-paths may have an average depth of between about 0.25 and about 3 inches.

In another aspect, the invention provides an airflow delivery system comprising an air moving element configured to move air in a flow path, a chamber in the flow path configured to receive product, an air transfer chamber comprising an inlet of a selected area for receiving air in the flow path and an outlet of a selected area for discharging air in the flow path, an airflow divider extending across the air transfer outlet and configured to divide airflow in the flow path, an airflow directional extending across the flow path downstream of the airflow divider and upstream of the chamber, the airflow directional having an upstream inlet face and a downstream outlet face and configured to receive airflow at an inlet velocity at the inlet face and to discharge the airflow from the downstream outlet face at an outlet velocity, wherein the inlet velocity is greater than or equal to the outlet velocity, and wherein the outlet velocity is at least 4 meters per second.

The area of the outlet of the air transfer chamber may be greater than the area of the inlet of the air transfer chamber, the inlet of the air transfer chamber may receive air in the flow path in a first direction and the outlet of the air transfer chamber may discharge air in the flow path in a second direction different from the first direction, and the airflow directional may be configured to receive airflow at the inlet face and split the airflow into multiple separated sub-paths within the flow path and to discharge the airflow from the downstream outlet face substantially parallel to the flow path. The air transfer chamber may comprise multiple turning vanes in the flow path and the second flow path direction may be perpendicular to the first flow path direction. The airflow divider may comprise a perforated plate, wire mesh or a wire screen. The airflow directional may comprise a first layer having an upstream inlet face and a downstream outlet face and multiple separated sub-paths within the flow path between the inlet face and the outlet face, the first layer configured to receive airflow at the inlet face and split the airflow into the multiple separated sub-paths within the flow path and to discharge the airflow from the downstream outlet face, a second layer downstream from the first layer and having an upstream inlet face, a downstream outlet face and multiple separated sub-paths within the flow path between the inlet face and the outlet face, the second layer configured to receive airflow at the inlet face of the second layer from the outlet face of the first layer and to discharge the airflow from the downstream outlet face of the second layer. The multiple separated sub-paths of the second layer may be configured relative to the multiple separated sub-paths of the first layer to split the airflow discharged from the multiple separated sub-paths of the first layer into the multiple separated sub-paths of the second layer and to discharge the airflow from the downstream outlet face of the second layer. At least a portion of the airflow discharged from at least two separated sub-paths of the first layer may be mixed together in at least one of the separated sub-paths of the second layer. The airflow delivery system may further comprise a second airflow divider extending across the flow path downstream of the airflow directional and upstream of the chamber and configured to divide airflow in the flow path. The area of the outlet of the air transfer chamber may be at least about four times greater than the area of the inlet of the air transfer chamber.

One objective of the present invention is to provide a nozzle that achieves the desired flow properties with low pressure loss. Another objective is to provide a nozzle for parallel flow ovens and dryers that turns the airflow ninety degrees and has uniform air velocity across the nozzle outlet face as well as outflow that is straight and parallel to the normal vector of the nozzle face. Another objective is to achieve the desired airflow pattern in geometries where the length of the outlet face is much longer than the height or the depth. Another objective is to provide a nozzle readily scalable to different oven or dryer widths and different spacing between parallel layers of product.

Another objective is to provide a nozzle for parallel flow, down flow or cross flow ovens and dryers that has uniform air velocity across the nozzle outlet face as well as outflow that is straight and parallel to the normal vector of the nozzle face.

DESCRIPTION OF THE PREFERRED EMBODIMENTS

Figure 1:
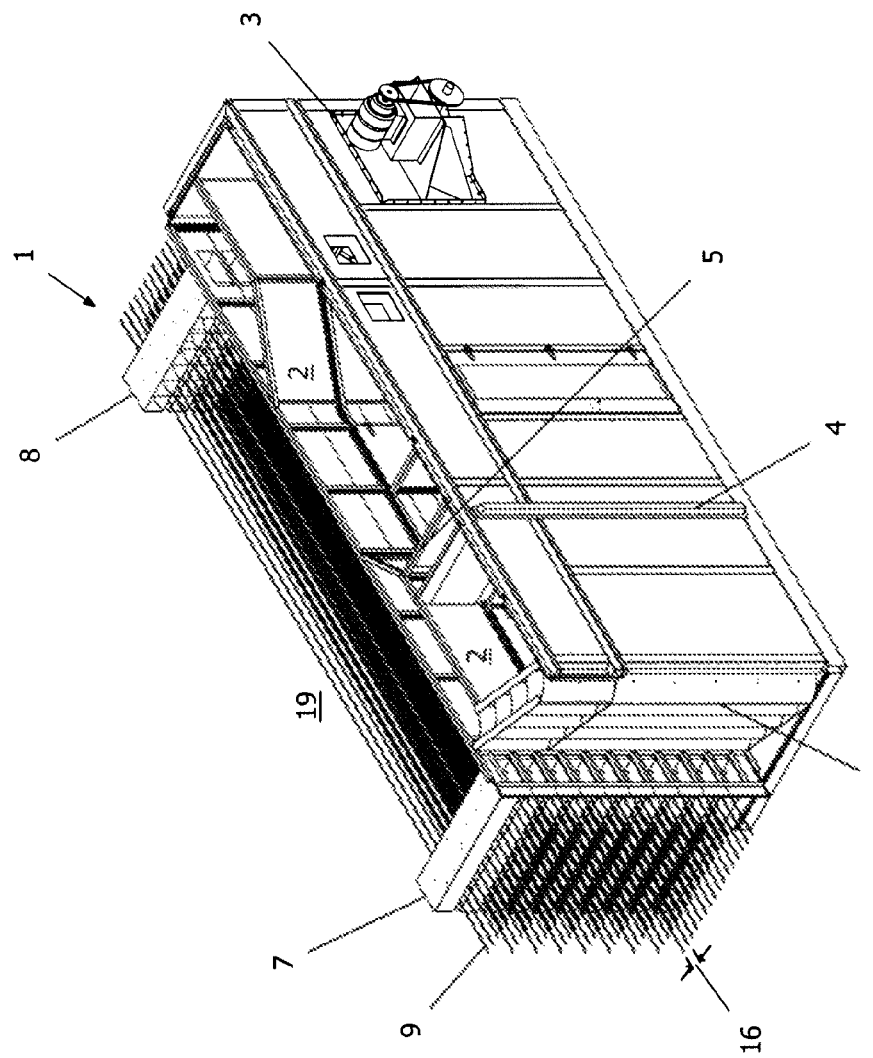
FIG. 1 is a partial perspective view of an embodiment of the present invention configured in an oven that provides airflow parallel to the product.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring to the drawings, and more particularly to FIG. 1 thereof, this invention provides an improved airflow delivery system, of which a first embodiment is generally indicated at 1. While this invention has many applications for providing a desired flow with reduced pressure loss, it is described with regard to its application to an oxidative stabilization oven for carbon fiber precursor.

FIG. 1 shows a portion of oven 1 with internal chamber 19 and product layers 9 arranged and moving in parallel horizontal planes. Air is circulated to contact product 9 by fan 3, which discharges into side plenum 2, which in turn channels the air through filter 4 and heater 5 and into turning vanes 6. From vanes 6 the heated air enters a set of nozzles 7, which are arranged above and below product layers 9, where the air is turned 90 degrees so that it is discharged in a direction parallel to the product 9 direction of travel. At the other end of oven 1, the air enters collection plenums 8 through which it returns to the inlet of fan 3.

Figure 2:
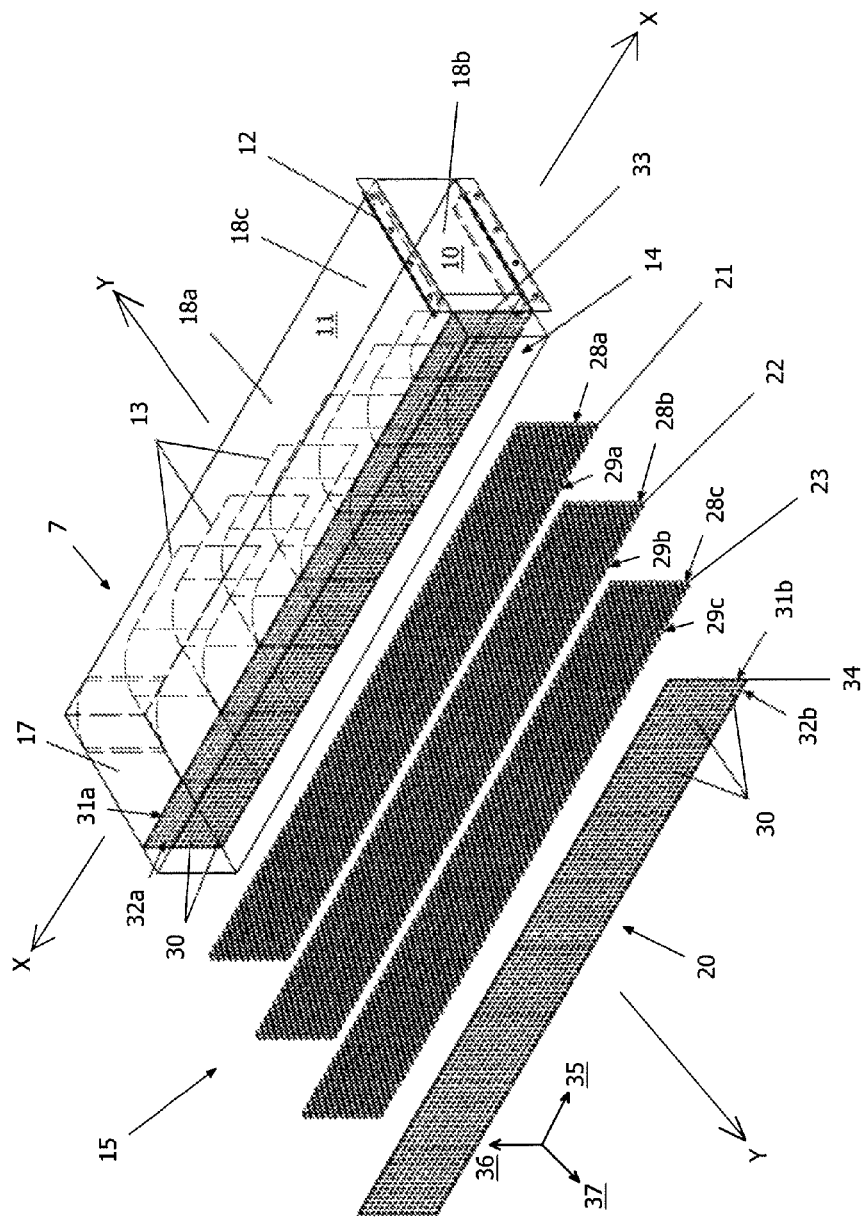
FIG. 2 is an exploded view of the nozzle shown in FIG. 1.

Referring now to FIG. 2, in this embodiment nozzle 7 is generally a rectangular cuboid made from sheet metal formed and welded using standard industrial practices. Nozzle 7 has a right open face 10 that serves as an air inlet and a front open face 14 that is perpendicular to inlet 10 and serves as an outlet. Solid face 17 is opposite air inlet 10 and top solid face 18*a*, bottom solid face 18*b* and rear solid face 18*c* are perpendicular to air inlet 10. Solid face 17, top face 18*a*, bottom face 18*b* and rear face 18*c* define transfer chamber 11. A plurality of vanes 13 in chamber 11, made from thin sheet metal that has been formed into 90 degree bends, are attached to both top and bottom solid faces 18*a* and 18*b* by discreet welds along their length. Vanes 13 are arranged so as to make a plurality of substantially equal size discharge channels that intersect perforated plate 33. Thus, airflow enters chamber 11 through inlet 10 in direction x-x and is turned by vanes 13, in this embodiment 90 degrees, to exit chamber 11 through outlet 14 generally in direction y-y.

The air discharge face 20 of nozzle 7, opposite solid face 18*c*, comprises upstream perforated plate 33, airflow directional 15, and downstream perforated plate 34. As shown, perforated plates 33 and 34 are configured with a pattern of airflow holes 30 that allow air to flow from the upstream side 31 of the respective plate to the downstream side 32 of the respective plate. It is preferable, but not necessary, that perforated plates 33 and 34 have the same pattern of holes 30 and sizes of holes 30. It is also preferable that the diameters of holes 30 in plates 33 and 34 be in the range of approximately 0.1 to 0.5 inches, and still more preferably in the range of approximately 0.2 to 0.4 inches. The open area of perforated plates 33 and 34 is preferably in the range of approximately 5 to 35% of the total area and more preferably in the range of approximately 15 to 25%.

Figure 3:
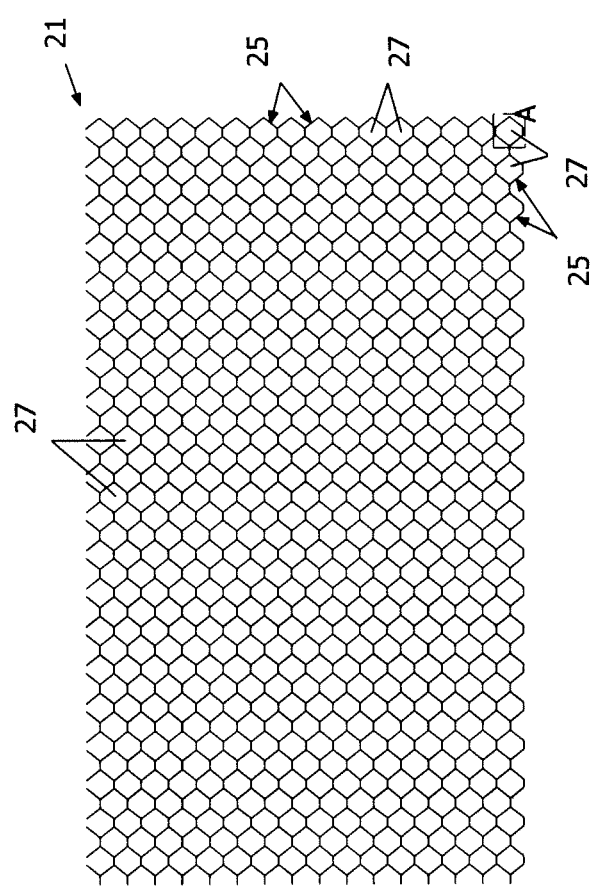
FIG. 3 is a downstream facing view of one layer of the airflow directional shown in FIG. 2.
Figure 4:
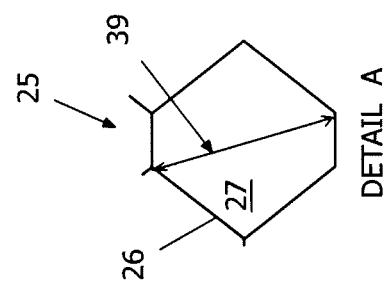
FIG. 4 is an enlarged detailed view of the airflow directional layer shown in FIG. 3, taken within the indicated area A of FIG. 3.

As shown in FIG. 2, airflow directional 15 is positioned between perforated plates 33 and 34 and, in this embodiment, comprises three sheets or layers 21, 22 and 23. As shown in FIG. 3, each of sheets 21-23 has multiple separate flow sub-passages 27*a-c* defined by a hexagonal cross-sectional structure that is formed with repeated open hexagonal cells 25 of the same size, commonly referred to as honeycombs. FIG. 3 shows an embodiment of layers 21-23 with a commercially available honeycomb shape. As shown, each of sheets 21-23 is formed by a repeated pattern of base cell 25, shown in FIG. 4, having six sides forming an inner air passage 27. Cell 25 preferably has no more than eight sides and more preferably has six sides. It is preferable, but not necessary, that all honeycomb layers 21-23 have the same cell 25 size, and that the cells have a longest transverse dimension 39 in the range of from approximately 0.15 to 0.75 inches, and more preferably in the range of approximately 0.3 to 0.6 inches. While a hexagonal cell is shown, other patterns may be used. For example, cell 25 could be any convex polygon or other shape. Sub-paths 27 have an average depth 37 of between approximately 0.25 and approximately 3 inches, and sub-path openings 27 have an area of between approximately 0.06 and approximately 1.5 square inches.

Figure 5:
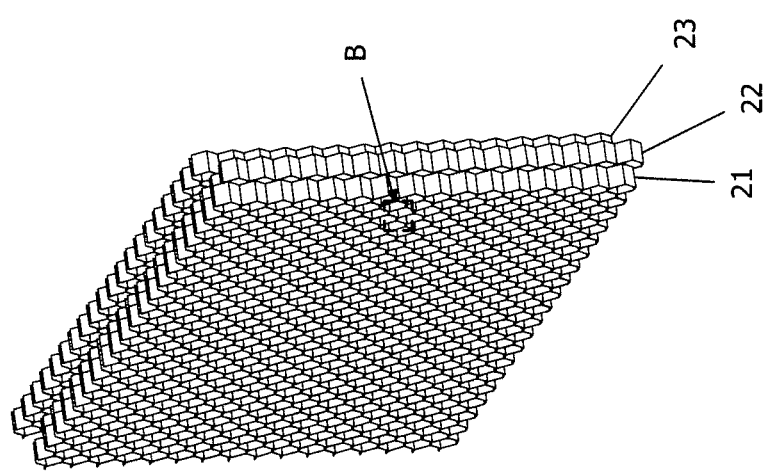
FIG. 5 is a downstream facing unexploded perspective view of the airflow directional shown in FIG. 2.

As shown in FIG. 5, in this embodiment honeycomb layers 21-23 are arranged in multiple layers with their faces free to touch. The upstream face 28*a* of layer 21 is positioned against the downstream face 32*a* of plate 33, layer 22 is positioned between the downstream face 29*a* of layer 21 and the upstream face 28*c* of layer 23, and the downstream face 29*c* of layer 23 is positioned against the upstream face 31*b* of plate 34.

Figure 6:
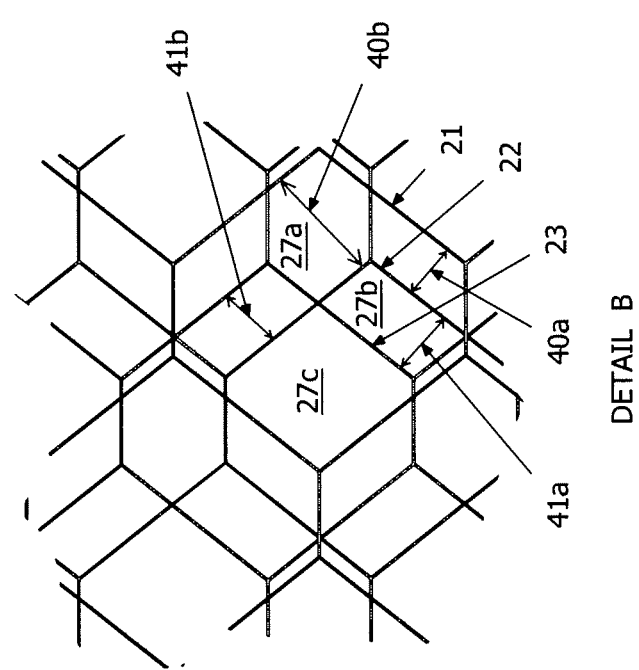
FIG. 6 is an enlarged detailed view of the airflow directional shown in FIG. 5, taken within the indicated area B of FIG. 5.

As shown in FIG. 6, layers 21-23 are arranged such that the leading edges 26 of their respective pattern of open cells 25, and thus their multiple separate flow sub-paths 27, are offset (40, 41) from one another, which is accomplished in this embodiment either by offsetting the cut at the ends or by using spacers on the boundaries of the respective layers. FIG. 6 shows such offsetting on the upstream face 28*a* of directional 15. As shown, the leading edge of layer 22 is offset from the leading edge of layer 21 by a distance 40*a* in a first dimension and 40*b* in a second dimension. Similarly, the leading edge of layer 23 is offset from the leading edge of layer 22 by a distance 41*a* in a first dimension and 42*b* in a second dimension. The distances are such that the leading edge of layer 23 is also offset from the leading edge of layer 21. While all three layers are offset in this embodiment, one or more layers may be configured so they are not offset with respect to one or more other layers.

The result of this offset is that the airflow path becomes tortuous due to the increased amount of leading edges encountered through the depth of airflow directional 15. With three or more layers, the random nature of the alignment makes the entire assembly 15 more uniform over large areas.

In addition, because first layer 21 has an upstream inlet face 28*a* and a downstream outlet face 29*a* and multiple separated sub-paths 27*a* within the flow path between the inlet face and the outlet face, layer 21 receives airflow at inlet face 28*a* and splits the airflow into multiple separated sub-paths 27*a* within the overall flow path and discharges the airflow from downstream outlet face 29*a*. Because second layer 22 downstream from first layer 21 is offset 40 from layer 21 and has an upstream inlet face 28*b*, a downstream outlet face 29*b* and multiple separated sub-paths 27*b* between inlet face 28*b* and outlet face 29*b*, the second layer receives airflow at inlet face 28*b* from outlet face 29*a* of first layer 21 and splits the airflow discharged from the multiple separated sub-paths 27*a* of the first layer into multiple separated sub-paths 27*b* of second layer 22 and discharges the airflow from downstream outlet face 29*b* of second layer 22. Because of offset 40, at least a portion of the airflow discharged from at least two separated sub-paths 27*a* of first layer 21 are mixed together in at least one of the separated sub-paths 27*b* of second layer 22. Similarly, because third layer 23 downstream from first layer 22 is offset 41 from layer 22 and has an upstream inlet face 28*c*, a downstream outlet face 29*c* and multiple separated sub-paths 27*c* between inlet face 28*c* and outlet face 29*c*, the third layer receives airflow at inlet face 28*c* from outlet face 29*b* of second layer 21 and splits the airflow discharged from the multiple separated sub-paths 27*b* of the second layer into multiple separated sub-paths 27*c* of third layer 23 and discharges the airflow from downstream outlet face 29*c* of third layer 22. Because of offset 41, at least a portion of the airflow discharged from at least two separated sub-paths 27*b* of second layer 22 are mixed together in at least one of the separated sub-paths 27*c* of third layer 23.

Airflow directional 15 can be formed from one or more layers of any rigid shape that presents a substantially open cross-section and multiple airflow sub-paths to the air flowing between perforated plates 33 and 34. It is preferable that the open area 27 of the face 28a of flow directional 15 be greater than approximately 80% of the total area, and more preferable that the open area 27 be greater than approximately 90% of the total area.

In this embodiment, the aspect ratio of the nozzle is such that outlet face 20 is much wider or longer than inlet face 10. Typically, horizontal product webs are spaced 150-300 mm apart and are 1500 to 4000 mm in width, which constrains the nozzle so that its outlet width 35 is 10 to 20 times more than its height 36. Also, in this embodiment, the depth dimension 37 of the nozzle is kept no more than 2 times the product spacing 16, which results in a higher fraction of product 9 in chamber 19 being exposed to the full air flow.

In this embodiment, the area of outlet 14 of air transfer chamber 11 is at least approximately four times greater than the area of inlet 10 of chamber 11. Multiple airflow openings 30 in perforated plates 33 and 34, respectively, have an aggregate area between approximately 5% and approximately 35% of the area of outlet 14 of chamber 11.

The average depth 37 of sub-paths 27 for directional 15 is greater than the average depth of openings 30 in plate 33, and the aggregate area of airflow openings 27 in inlet face 28a of airflow directional 15 is substantially greater than the aggregate area of airflow openings 30 in plate 33, and the average depth of sub-paths 27 for directional 15 is greater than the longest dimension 39 of openings 27. Furthermore, in this embodiment sub-paths 27a of first layer 21 themselves have an average depth greater than the average depth of openings 30 in airflow divider 33, have an aggregate area of airflow openings 27a in inlet face 28a substantially greater than the aggregate area of airflow openings 30 in airflow divider 33, and have an average depth greater than the longest dimension 39 of sub-paths 27a. Similarly, the sub-paths 27b and 27c of second layer 22 and third layer 23, respectively, each have an average depth greater than the average depth of openings 30 in airflow divider 33, have an aggregate area of substantially greater than the aggregate area of airflow openings 30 in airflow divider 33, and have an average depth greater than the longest dimension 39.

Nozzle 7 provides airflow suitable for parallel flow ovens, coolers, curing chambers, and dryers. Nozzle 7 turns the airflow ninety degrees from an inlet 10 perpendicular to the nozzle outlet. Nozzle 7 also provides airflow into chamber 19 that has uniform air velocity across nozzle discharge face 20 and is substantially straight and normal to nozzle discharge face 20 and substantially parallel to axis y-y.

In alternative embodiments, the pattern of repeated airflow openings of the sub-paths of first layer 21 may be substantially different from the pattern of repeated airflow openings of the sub-paths of second layer 22. Similarly, the pattern of openings in third layer 23 may be substantially different from the pattern of openings in second layer 22 and the same or different from the pattern of openings in first layer 21. The average depth of the sub-paths of first layer 21 may be substantially different than the average depth of the sub-paths of second layer 22 and/or third layer 23. Also, the aggregate area of the airflow openings in inlet face 28a of first layer 21 may be substantially different than the aggregate area of the airflow openings in inlet face 28b and/or 28c of second layer 22 and/or third layer 23, respectively. The longest dimension of the openings of the sub-paths of first layer 21 may be substantially different than the longest dimension of the openings of the sub-paths of second layer 22 and/or third layer 23. In addition, as indicated below, more than three layers may be employed. Also, a single layer 21 or just two layers 21 and 22 may be employed.

Because forced convection ovens, coolers, curing chambers, and dryers use fans that at large scale can draw several hundred kilowatts, it is a significant disadvantage if the airflow directing nozzle does not perform its function with low pressure losses, as the fan power required is directly proportional to the total pressure drop in the system, and the nozzle will typically cause the largest pressure drop in the circuit. Given the flow path created by plates 33 and 34 and airflow directional 15, comprising multiple offset honeycomb layers, a high pressure loss was expected. However, when tested the pressure drop resulting from nozzle 7 was substantially lower than expected.

Figure 7:
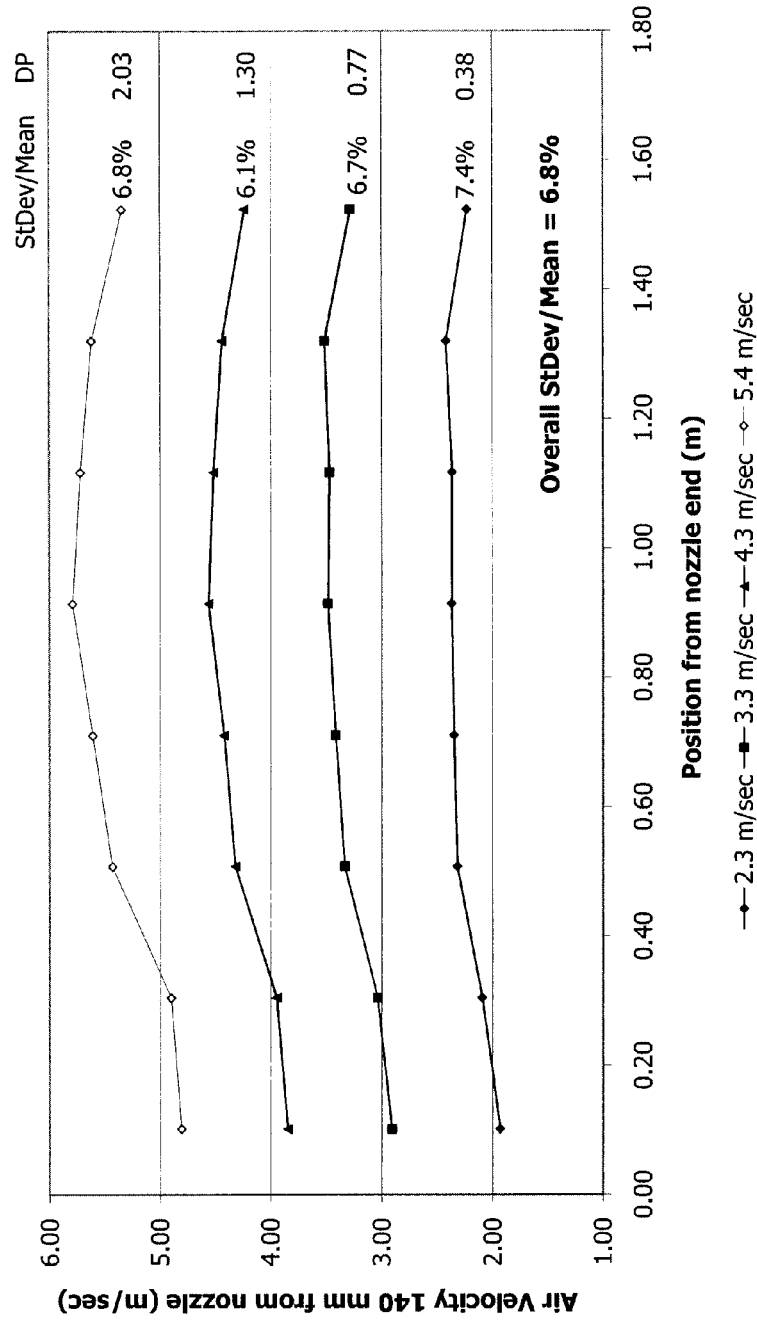
FIG. 7 is a graph of a set of measured velocity uniformity data and the corresponding dimensionless parameters for a comparative example or conventional design.

A construction similar to the oven portion shown in FIG. 1 was used to evaluate the performance of different embodiments of nozzle 7, as compared to a conventional design. In the test setup, a 20 hp fan was used to supply air simultaneously to a set of three parallel nozzles in the same way as shown in FIG. 1. A dimensionless parameter that is useful as a criterion of airflow uniformity out of a nozzle is the ratio of the velocity standard deviation to the velocity mean from a set of measurements taken at different locations that cover the area of the nozzle. FIG. 7 shows the variation of the velocity uniformity parameter for a conventional design, for four different mean gas flow rates, which correspond in affect to four different fan speeds. The nozzle for this example was 1600 mm wide, 200 mm high and 400 mm deep. The air inlet was on a face that was 200 mm×400 mm and the air outlet was on a face that was 200 mm×1600 mm. There were 7 vanes in the nozzle, evenly spaced both over the inlet and outlet, which were 200 mm high and were welded to the upper and lower faces. At the outlet were 2 parallel perforated plates, 76 mm apart, and having 15% open area and 6 mm diameter holes. There were 8 air velocity readings taken at each of the different fan speeds. These 8 points were selected to be 200 mm apart and cover essentially the entire width of the nozzle. Vertically, the data was collected in the center of the nozzle, which was 100 mm from the bottom. An Extech Instruments model 407113 thermo-anemometer was used for the velocity measurements. In all cases 20 separate velocity readings were averaged at each data location. In all cases the air temperature was between 20 and 24° C. FIG. 7 shows the StDev/Mean velocity uniformity parameter for each of four constant fan speeds (shown as the mean velocity) which includes the readings from the 8 positions along the width, and also an overall value that takes into account all 32 readings. In FIG. 7 the individual fan speed velocity parameters range from 6.1 to 7.4% and the overall value was 6.8%.

Figure 8:
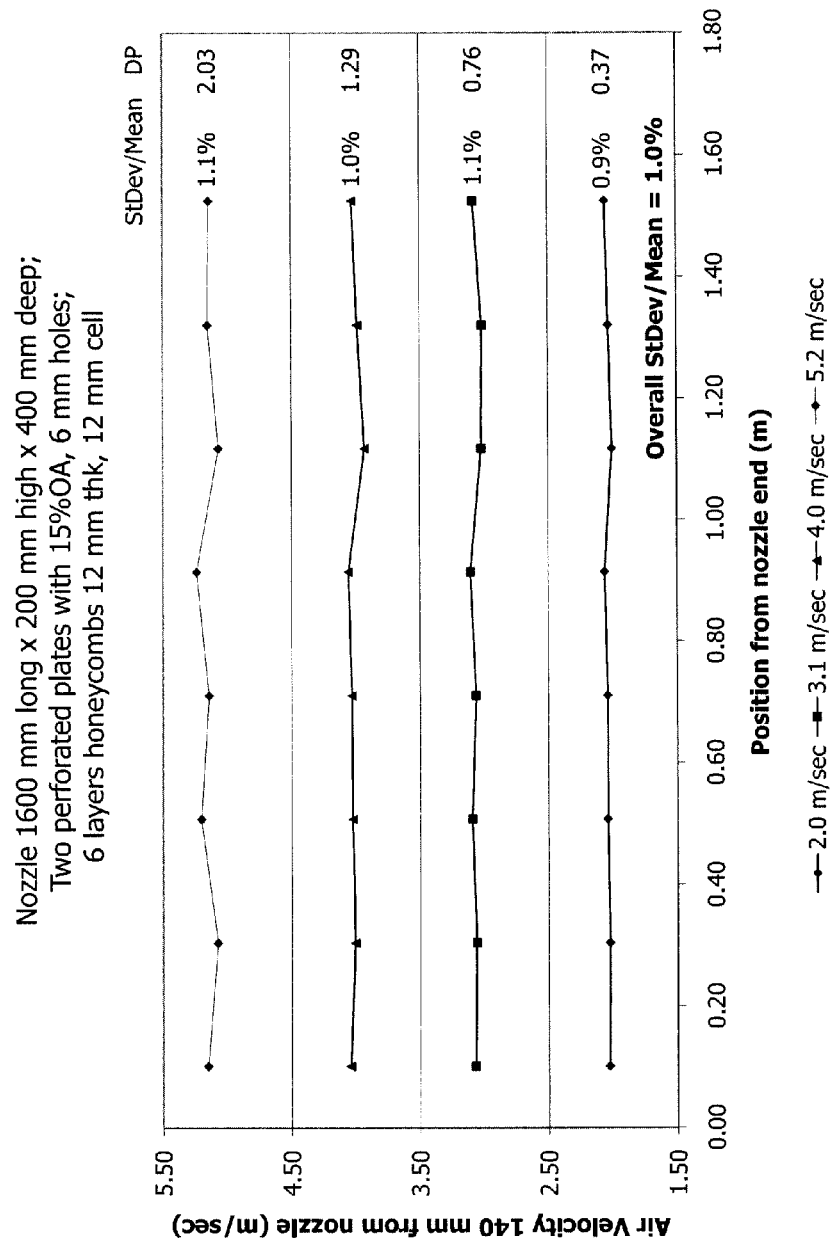
FIG. 8 is a graph of a set of measured velocity uniformity data and the corresponding dimensionless parameters for an embodiment of the current invention.

FIG. 8 shows the velocity uniformity parameter for an embodiment of the present invention. The nozzle size was the same as the conventional design, namely 1600 mm wide, 200 mm high and 400 mm deep. There were 7 turning vanes and 2 parallel perforated plates that were also the same as the conventional design. In this embodiment of the improved nozzle, 6 layers of honeycomb material with 12 mm cell size and each 12.7 mm deep (for total depth of 76 mm) were inserted between the perforated plates. As shown in FIG. 8, the individual fan speed velocity parameters ranged from 0.9 to 1.1% and the overall value was 1.0%. As shown, the velocity uniformity in this embodiment was a substantial improvement over the conventional design with the addition of the structured flow directional 15.

FIGS. 7 and 8 also show the pressure drop (DP) for each of the four sets of data (which represent constant fan speeds). The pressure was measured just upstream of the nozzle using a Shortridge Instruments model ADM-860 electronic micromanometer. In all cases 12 separate readings were averaged at each fan speed. As shown, and unexpectedly, the pressure drops in this embodiment of the improved nozzle were effectively equal to the pressure drop in the conventional design. This was a surprising result in that the superior flow uniformity achieved from the addition of directional 15 did not come at the cost of imposing a higher pressure drop.

Figure 9:
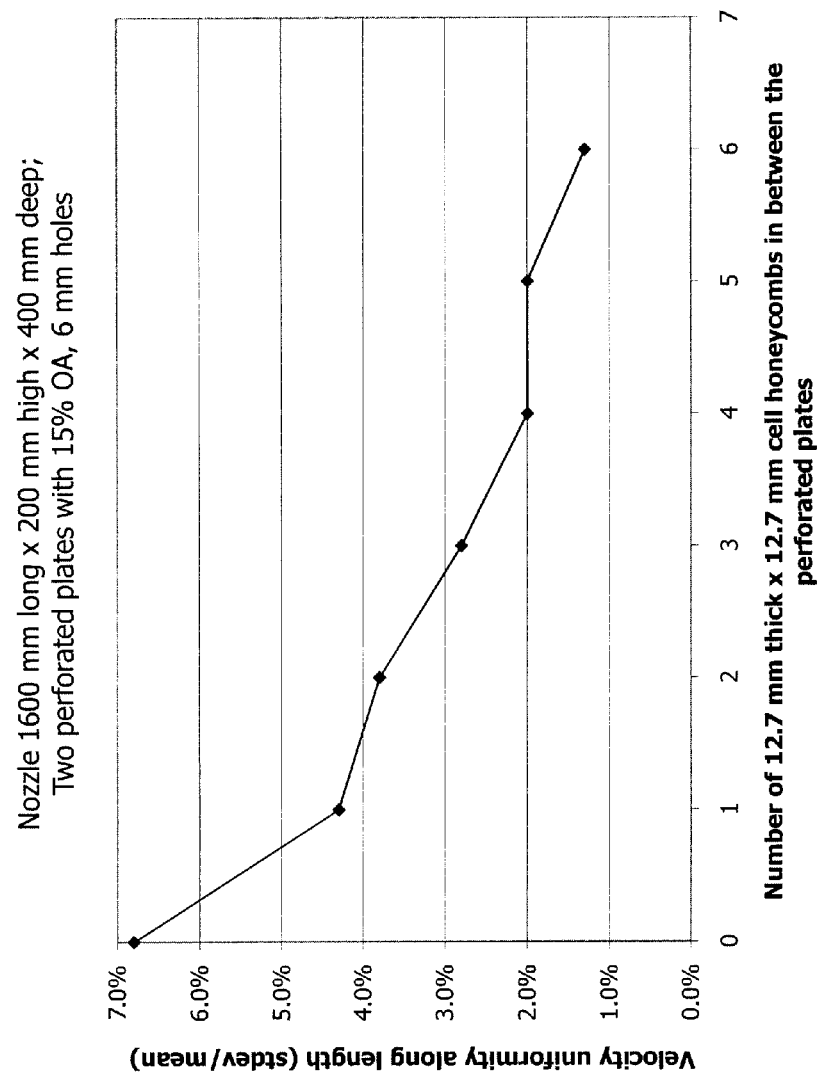
FIG. 9 is a graph of the variation of the velocity uniformity parameter as a function of the number and thickness of honeycombs included between parallel perforated plates.

FIG. 9 shows the variation in the velocity uniformity parameter as a function of the number and therefore overall thickness of the honeycomb material inserted between the perforated plates of this embodiment. Where there were multiple pieces of honeycomb material, they were arranged so that the adjacent faces were essentially touching with no gaps. The flow uniformity improves as the number of pieces or layers of 12.7 mm thick honeycomb material increases. After 6 pieces, or 76 mm total depth, the uniformity parameter was judged to be approaching the limit of resolution of the measurement system.

Figure 10:
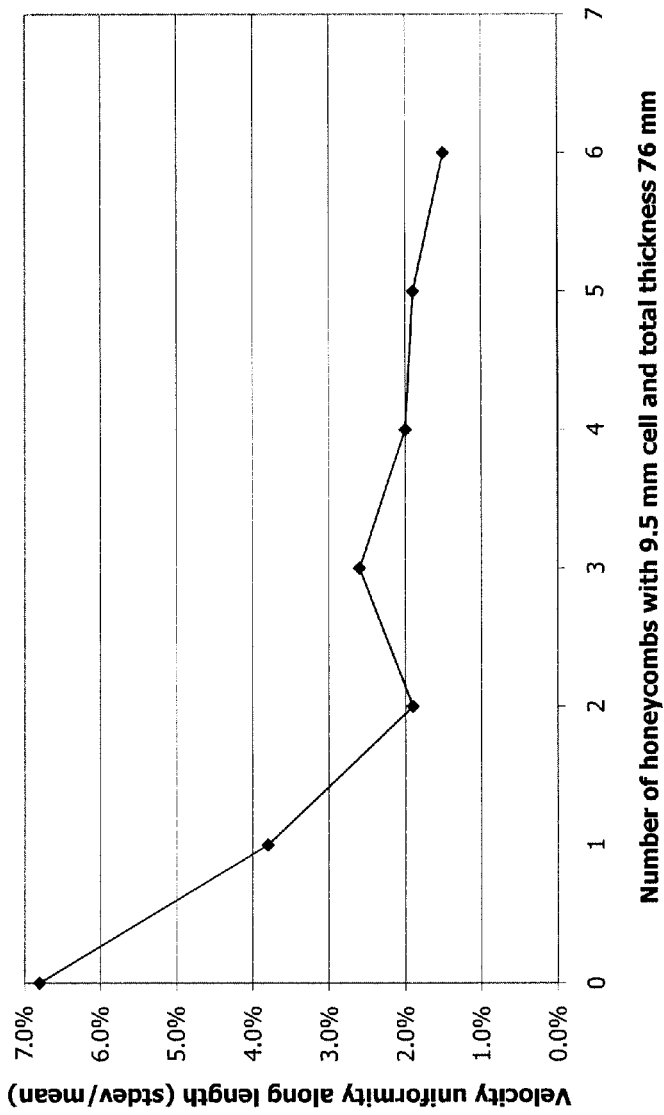
FIG. 10 is a graph of the variation of the velocity uniformity parameter as a function of the number of honeycomb interfaces in a fixed thickness arrangement.

FIG. 10 shows the variation of the velocity uniformity parameter as a function of the number of honeycombs at a fixed overall honeycomb depth or thickness of 76 mm. In this case, various different thickness pieces of honeycomb were used to achieve a constant total thickness, so that the variation between the trials was that there were a different number of interfaces between honeycombs. As with the other reported data, the honeycombs were essentially touching at their respective faces. This was a surprising result in that the velocity uniformity gets better as the number of individual layers, and therefore interfaces between layers, increases. So, for example, three layers of honeycomb 25.4 mm thick outperform a single layer 76 mm thick, and six layers 12.7 mm thick outperforms three layers 25.4 mm thick.

Figure 11:
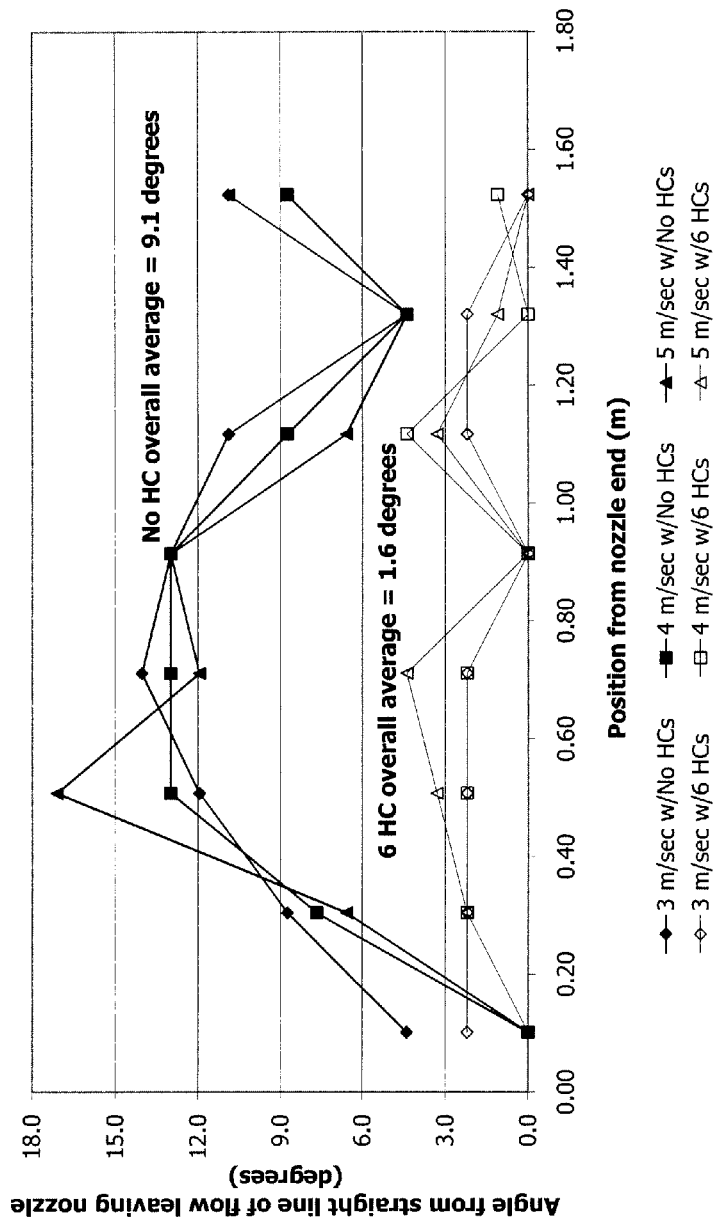
FIG. 11 is a graph of measured velocity straightness data for the comparative example and an embodiment of the present invention.

FIG. 11 shows measured airflow straightness data for the conventional design or comparative example and an embodiment of the improved nozzle. The comparative example and an embodiment of the improved nozzle were the same as described previously with reference to FIGS. 7 and 8, respectively. There were 8 airflow angle readings taken at each of the different fan speeds. These 8 points were selected to be 200 mm apart and cover essentially the entire length of the nozzle. Vertically, the data was collected in the center of the nozzle, which was 100 mm from the bottom. The measurement was made by attaching a thread that extended 600 mm from the nozzle face at each of the 8 locations and then using a tape measure to measure the position of the thread at a point 400 mm from the nozzle face. The angle was then calculated from elementary geometry, with 0 degrees being defined as the angle normal to the face of the nozzle. FIG. 11 shows that the comparative example or conventionally designed nozzle has a high degree of variation off the normal especially in the center region, with most individual readings off by over 10 degrees. The overall average angle variation from normal for the comparative example nozzle was 9.1 degrees. The data from this embodiment of the improved nozzle were substantially better with a large majority of the angle readings off normal by less than 3 degrees and an overall average angle variation from normal of only 1.6 degrees.

Figure 12:
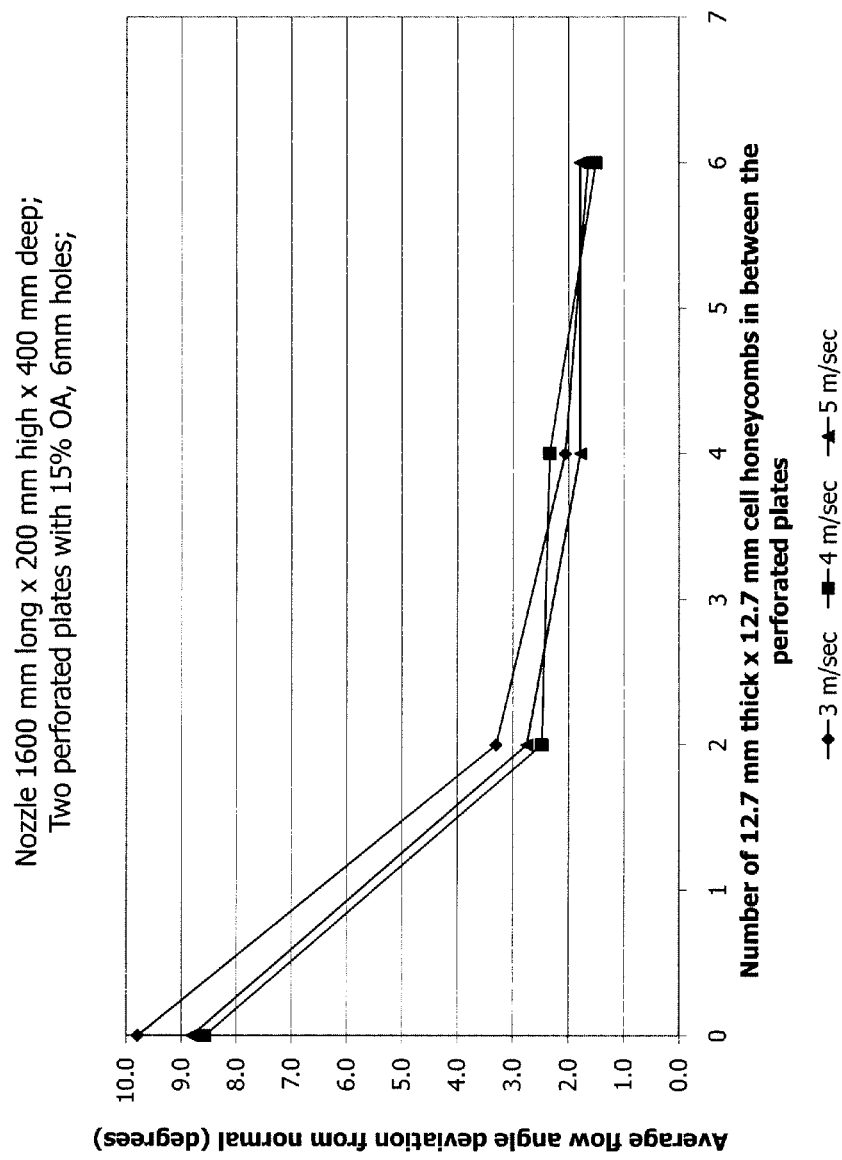
FIG. 12 is a graph of the variation of the flow straightness as a function of the number and thickness of honeycombs included between parallel perforated plates.

FIG. 12 shows the variation in the airflow straightness as a function of the number and therefore overall depth or thickness of the honeycomb material inserted between the perforated plates of the preferred embodiment. The airflow straightness improves as the number of pieces of 12.7 mm honeycomb material increases.

The present invention contemplates that many changes and modifications may be made. Therefore, while the presently-preferred form of the airflow delivery system has been shown and described, and several modifications and alternatives discussed, persons skilled in this art will readily appreciate that various additional changes and modifications may be made without departing from the spirit and scope of the invention, as defined and differentiated by the following claims.

What is claimed is:

1. An airflow delivery system comprising:
an air moving element configured to move air in a flow path;
a chamber in said flow path configured to receive product;
an air transfer chamber comprising an inlet of a selected area for receiving air in said flow path in a first direction and an outlet of a selected area greater than said area of said inlet for discharging air in said flow path in a second direction different from said first direction;
an airflow divider extending across said air transfer outlet and configured to divide airflow in said flow path;
an airflow directional extending across said flow path downstream of said airflow divider and upstream of said chamber;
said airflow directional having an upstream inlet face and a downstream outlet face and configured to receive airflow at said inlet face and split said airflow into multiple separated sub-paths within said flow path and to discharge said airflow from said downstream outlet face substantially parallel to said flow path and without substantial reduction in static pressure;
said airflow directional comprising a first layer having an upstream inlet face and a downstream outlet face and multiple separated sub-paths within said flow path between said inlet face and said outlet face;
said first layer configured to receive airflow at said inlet face of said first layer and split said airflow into said multiple separated sub-paths within said flow path and to discharge said airflow from said downstream outlet face of said first layer;
said airflow directional comprising a second layer downstream from said first layer and having an upstream inlet face, a downstream outlet face and multiple separated sub-paths within said flow path between said inlet face and said outlet face;
said second layer configured to receive airflow at said inlet face of said second layer from said outlet face of said first layer and to discharge said airflow from said downstream outlet face of said second layer; and
wherein said multiple separated sub-paths of said second layer are configured relative to said multiple separated sub-paths of said first layer to split said airflow discharged from said multiple separated sub-paths of said first layer into said multiple separated sub-paths of said second layer and to discharge said airflow from said downstream outlet face of said second layer.

2. The airflow delivery system set forth in claim 1, wherein said air moving element comprises an eductor, blower or a fan.

3. The airflow delivery system set forth in claim 1, wherein said chamber is a heating, cooling, curing, or drying chamber.

4. The airflow delivery system set forth in claim 1, wherein said air transfer chamber comprises multiple turning vanes in said flow path and said second flow path direction is perpendicular to said first flow path direction.

5. The airflow delivery system set forth in claim 1, wherein said airflow divider comprises a perforated plate, wire mesh or a wire screen.

6. The airflow delivery system set forth in claim 1, wherein at least a portion of said airflow discharged from at least two separated sub-paths of said first layer are mixed together in at least one of said separated sub-paths of said second layer.

7. The airflow delivery system set forth in claim 1, and further comprising a second airflow divider extending across said flow path downstream of said airflow directional and upstream of said chamber and configured to divide airflow in said flow path.

8. The airflow delivery system set forth in claim 7, wherein said second airflow divider comprises a perforated plate, wire mesh or a wire screen.

9. The airflow delivery system set forth in claim 1, wherein said area of said outlet of said air transfer chamber is at least about four times greater than said area of said inlet of said air transfer chamber.

10. The airflow delivery system set forth in claim 1, wherein said airflow divider comprises multiple airflow openings having an aggregate area between about 5% and about 35% of said area of said outlet of said air transfer chamber.

11. The airflow delivery system set forth in claim 1, wherein said airflow divider comprises multiple airflow openings each having a longest dimension perpendicular to the flow path of between about 0.1 and about 0.75 inches.

12. The airflow delivery system set forth in claim 1, wherein said sub-paths have an average depth and are defined at said inlet face by a pattern of repeated airflow openings, each of said openings having an area perpendicular to said flow path and characterized by a longest dimension perpendicular to said flow path of between about 0.15 and about 0.75 inches.

13. The airflow delivery system set forth in claim 1, wherein said sub-paths are defined at said inlet face by a pattern of repeated airflow openings, each of said openings having an area perpendicular to said flow path.

14. The airflow delivery system set forth in claim 13, wherein said pattern of repeated sub-paths is a polygonal cellular pattern.

15. The airflow delivery system set forth in claim 1, wherein said sub-paths are formed from multiple off-set thin-walled hexagonal honeycomb layers.

16. The airflow delivery system set forth in claim 1, wherein said sub-paths have an average depth and are defined at said inlet face by a pattern of repeated airflow openings, each of said openings having an area perpendicular to said flow path, and wherein said sub-paths having an average depth of between about 0.25 and about 3 inches, and said sub-path openings have an area of between about 0.06 and about 1.5 square inches.

17. An airflow delivery system comprising:
an air moving element configured to move air in a flow path;
a chamber in said flow path configured to receive product;
an air transfer chamber comprising an inlet of a selected area for receiving air in said flow path in a first direction and an outlet of a selected area greater than said area of said inlet for discharging air in said flow path in a second direction different from said first direction;
an airflow divider extending across said air transfer outlet and having multiple airflow openings;

said airflow openings of said airflow divider having an average depth and an aggregate area perpendicular to said flow path;
an airflow directional extending across said flow path downstream of said airflow divider and upstream of said chamber;
said airflow directional having an upstream inlet face, a downstream outlet face, and multiple different sub-paths between said inlet face and said outlet face;
said sub-paths having an average depth and defined at said inlet face by a pattern of repeated airflow openings, each of said openings having an area perpendicular to said flow path and characterized by a longest dimension perpendicular to said flow path;
said average depth of said sub-paths being greater than said average depth of said openings in said air flow divider;
said aggregate area of said airflow openings in said inlet face of said airflow directional being substantially greater than said aggregate area of said airflow openings in said airflow divider; and
said average depth of said sub-paths being greater than said longest dimension of said openings perpendicular to said flow path of said sub-paths
said airflow directional comprising a first layer having an upstream inlet face and a downstream outlet face and multiple separated sub-paths within said flow path between said inlet face and said outlet face;
said first layer configured to receive airflow at said inlet face of said first layer and split said airflow into said multiple separated sub-paths within said flow path and to discharge said airflow from said downstream outlet face of said first layer;
said airflow directional comprising a second layer downstream from said first layer and having an upstream inlet face, a downstream outlet face and multiple separated sub-paths within said flow path between said inlet face and said outlet face;
said second layer configured to receive airflow at said inlet face of said second layer from said outlet face of said first layer and to discharge said airflow from said downstream outlet face of said second layer; and
wherein said multiple separated sub-paths of said second layer are configured relative to said multiple separated sub-paths of said first layer to split said airflow discharged from said multiple separated sub-paths of said first layer into said multiple separated sub-paths of said second layer and to discharge said airflow from said downstream outlet face of said second layer.

18. The airflow delivery system set forth in claim 17, wherein said air moving element comprises an eductor, blower or a fan.

19. The airflow delivery system set forth in claim 17, wherein said chamber is a heating, cooling, curing or drying chamber.

20. The airflow delivery system set forth in claim 17, wherein said air transfer chamber comprises multiple turning vanes in said flow path and said second flow path direction is perpendicular to said first flow path direction.

21. The airflow delivery system set forth in claim 17, wherein said air divider comprises a perforated plate, wire mesh or a wire screen.

22. The airflow delivery system set forth in claim 17, wherein at least a portion of said airflow discharged from at least two separated sub-paths of said first layer are mixed together in at least one of said separated sub-paths of said second layer.

23. The airflow delivery system set forth in claim 17, wherein:
said sub-paths of said first layer having an average depth and are defined at said inlet face by a pattern of repeated airflow openings, said openings having an aggregate area perpendicular to said flow path and characterized by a longest dimension perpendicular to said flow path;
said average depth of said sub-paths of said first layer being greater than said average depth of said openings in said air flow divider;
said aggregate area of said airflow openings in said inlet face of said first layer being substantially greater than said aggregate area of said airflow openings in said airflow divider; and
said average depth of said sub-paths of said first layer being greater than said longest dimension of said openings perpendicular to said flow path of said sub-paths.

24. The airflow delivery system set forth in claim 23, wherein:
said sub-paths of said second layer having an average depth and are defined at said inlet face by a pattern of repeated airflow openings, said openings having an aggregate area perpendicular to said flow path and characterized by a longest dimension perpendicular to said flow path;
said average depth of said sub-paths of said second layer being greater than said average depth of said openings in said air flow divider;
said aggregate area of said airflow openings in said inlet face of said second layer being substantially greater than said aggregate area of said airflow openings in said airflow divider; and
said average depth of said sub-paths of said second layer being greater than said longest dimension of said openings perpendicular to said flow path of said sub-paths.

25. The airflow delivery system set forth in claim 24, wherein said pattern of repeated airflow openings of said sub-paths of said first layer is substantially different from said pattern of repeated airflow openings of said sub-paths of said second layer.

26. The airflow delivery system set forth in claim 24, wherein said average depth of said sub-paths of said first layer is substantially different than said average depth of said sub-paths of said second layer.

27. The airflow delivery system set forth in claim 24, wherein said aggregate area of said airflow openings in said inlet face of said first layer is substantially different than said aggregate area of said airflow openings in said inlet face of said second layer.

28. The airflow delivery system set forth in claim 24, wherein said longest dimension of said openings of said sub-paths of said first layer is substantially different than said longest dimension of said openings of said sub-paths of said second layer.

29. The airflow delivery system set forth in claim 17, wherein said area of said outlet of said air transfer chamber is at least about four times greater than said area of said inlet of said air transfer chamber.

30. The airflow delivery system set forth in claim 17, wherein said airflow openings of said airflow divider having an aggregate area between about 5% and about 35% of said area of said outlet of said air transfer chamber.

31. The airflow delivery system set forth in claim 17, wherein said airflow openings of said airflow divider each have a diameter and said diameter is between about 0.1 and about 0.75 inches.

32. The airflow delivery system set forth in claim 17, wherein said longest dimension of each of said sub-paths is between about 0.15 and about 0.75 inches.

33. The airflow delivery system set forth in claim 17, wherein said pattern of repeated sub-paths is a hexagonal cellular pattern.

34. The airflow delivery system set forth in claim 17, wherein said pattern of repeated sub-paths is a polygonal cellular pattern.

35. The airflow delivery system set forth in claim 17, wherein said sub-paths are formed from multiple off-set thin-walled hexagonal honeycomb layers.

36. The airflow delivery system set forth in claim 17, wherein said sub-paths having an average depth of between about 0.25 and about 3 inches.

37. The airflow delivery system set forth in claim 17, wherein said sub-path openings each have an area of between about 0.06 and about 1.5 square inches and have an aggregate area of at least about 80% of said area of said outlet of said air transfer chamber.

38. The airflow delivery system set forth in claim 17, wherein said average depth of said openings in said air flow divider is from about 0.03 to about 0.12 inches.

39. The airflow delivery system set forth in claim 17, and further comprising a second airflow divider extending across said flow path downstream of said airflow directional and upstream of said chamber and configured to divide airflow in said flow path.

40. The airflow delivery system set forth in claim 39, wherein said second airflow divider comprises a perforated plate, wire mesh or a wire screen.

41. The airflow delivery system set forth in claim 17, wherein said air transfer chamber is a rectangular chamber.

* * * * *